(12) United States Patent
Jack

(10) Patent No.: US 8,277,168 B2
(45) Date of Patent: Oct. 2, 2012

(54) TIDAL POWER APPARATUS

(76) Inventor: Hardisty Jack, Yorkshire (GB)

(*) Notice: Subject to any disclaimer, the term of this patent is extended or adjusted under 35 U.S.C. 154(b) by 415 days.

(21) Appl. No.: 12/311,992

(22) PCT Filed: Aug. 2, 2007

(86) PCT No.: PCT/GB2007/050467
§ 371 (c)(1),
(2), (4) Date: Apr. 21, 2009

(87) PCT Pub. No.: WO2008/050149
PCT Pub. Date: May 2, 2008

(65) Prior Publication Data
US 2009/0322091 A1 Dec. 31, 2009

(30) Foreign Application Priority Data
Oct. 27, 2006 (GB) .................... 0621381.3

(51) Int. Cl.
F01D 1/02 (2006.01)
(52) U.S. Cl. ......... 415/2.1; 415/4.1; 415/905; 415/53.1; 415/159; 416/85
(58) Field of Classification Search ............... 415/2.1, 415/3.1, 7, 4.1, 4.2, 4.4, 905, 906, 907, 53.1, 415/53.3, 159–160, 163, 90; 416/85–86
See application file for complete search history.

(56) References Cited

U.S. PATENT DOCUMENTS

| 1,782,277 | A | 11/1930 | Smith | |
| 4,279,569 | A | 7/1981 | Harloff | |
| 4,335,319 | A | 6/1982 | Mettersheimer | |
| 6,837,757 | B2 * | 1/2005 | Van Dine et al. | 440/6 |
| 7,471,009 | B2 * | 12/2008 | Davis et al. | 290/54 |
| 2006/0008351 | A1 | 1/2006 | Belinsky | |
| 2010/0209236 | A1 * | 8/2010 | Freeman et al. | 415/208.1 |
| 2011/0115228 | A1 * | 5/2011 | Stothers et al. | 290/52 |

FOREIGN PATENT DOCUMENTS

| BE | 894952 | 1/1983 |
| DE | 10026674 | 5/2000 |
| FR | 2369440 | 10/1977 |
| FR | 2867523 | 12/2003 |
| GB | 2 001 396 A | 1/1979 |
| GB | 2153917 | 8/1985 |
| GB | 2312931 | 11/1997 |
| GB | 2337305 | 11/1999 |
| JP | 62 055469 A | 3/1987 |
| JP | 62-267577 | 11/1987 |
| RU | 2160848 | 12/2000 |
| WO | WO 92/21877 | 12/1992 |
| WO | WO 2005/035977 | 4/2005 |
| WO | WO 2005/078276 | 8/2005 |

OTHER PUBLICATIONS

Abstract from IP.com (JP62267577A).

* cited by examiner

Primary Examiner — Gary F. Paumen

(57) ABSTRACT

A tidal power apparatus comprises a moored pontoon (1) having a duct (2) therethrough opening at opposed ends of the pontoon. The duct has a vertical axis rotor (3) therein driving an electrical generator (6). A deflector vane (8) is located in the duct at each end thereof, each deflector vane being mounted to pivot about a vertical axis between an active position, in which the deflector vane deflects water flow to one side of the rotor axis to cause rotation of the rotor, and an inactive position substantially aligned with the water flow from the turbine.

13 Claims, 2 Drawing Sheets

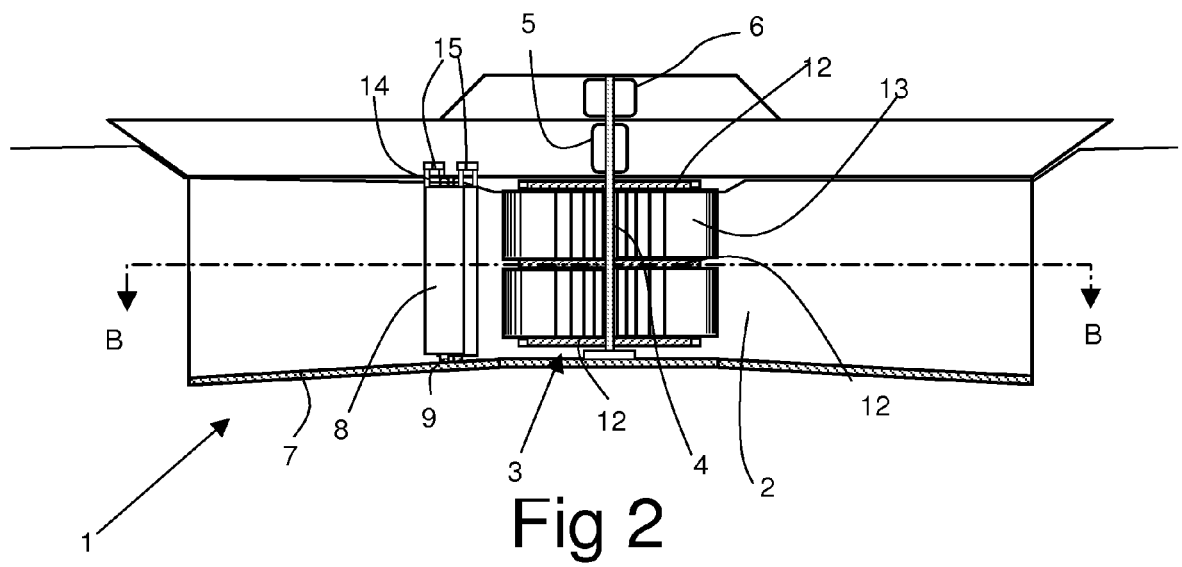

TIDAL POWER APPARATUS

FIELD OF THE INVENTION

This invention relates to apparatus for extracting energy from tidal flows.

BACKGROUND TO THE INVENTION

Tidal power devices offer advantages over wave power devices: tides are regular and predictable, whereas wave power depends essentially upon weather conditions; and lower device masses can be employed at coastal sites, because locations for tidal devices are generally exposed to less extreme weather and the devices do not therefore have to be constructed to the same level of survivability as ocean wave power devices.

Several major tidal power schemes have been constructed in river estuaries, but these have involved barrages and major engineering works, and they risk permanent changes to eco-systems in areas of importance to wildlife. They are extremely costly to build, and it is increasingly difficult to find suitable locations for such schemes.

There have been several proposals for smaller-scale, in stream, tidal power devices that have less environmental impact. For example:

Wo2005078276 discloses a device which floats in a tidal flow beneath the water surface and employs multiple turbines arranged on horizontal axes.

BE894952 discloses a turbine system in a moored floating pontoon. It has three directing channels, two of which are rectangular side ducts and the other an open duct, which direct the water flow on to a vertical axis, planar and hinged bladed water wheel.

GB2153917 discloses a system in which tidal lagoons feed two vertical axis planar bladed rotors in a pontoon floating in a specially-constructed chamber.

GB2337305 relates to a large vertical axis rotor with aerofoil blades to cause rotation of the floating structure relative to a tethered ring cam pumping mechanism.

DE10026674 relates to apparatus having a number of horizontal axis, planar bladed, rotors mounted in front of a weir and floating up and down under compressed air control in line with the water levels.

RU2160848 concerns a floating power station in which a large horizontal axis 'blind' rotor similar to a paddle steamer's is carried on a floating bridge or pontoon.

FR2867523 discloses an array of vertical axis turbines carried beneath a tethered barge, but without any ducting.

US2006008351 relates to a device having a row of horizontal axis Darrieus rotors driving a surface generator through a 90 degree gearbox.

FR2369440 discloses a floating pontoon which seeks to exploit both tidal flows and wave movement. The turbines are slung beneath the pontoon, but can also be supplied with water collected by wave movement flowing downwardly from the pontoon and on to the turbines.

GB2312931 discloses a tidal or wave generator having an upright rotor in a channel housing which includes pivoting baffles which move between a closed position directing flow towards the rotor, and an open position against the wall of the channel.

Similarly, WO2005/035977 discloses a tidal generator with pivoting baffles directing flow to one side of the rotor while swinging out of the way when downstream.

WO92/21877 discloses an apparatus in which the rotor is mounted on a horizontal axle across the channel, with reversible baffles mounted on horizontal axles and intended to direct flow to one side of the rotor, while swinging out of the way when downstream.

The present invention seeks to provide a simple and cost-effective apparatus for extraction of tidal energy.

SUMMARY OF THE INVENTION

According to the present invention, there is provided a tidal power apparatus, comprising a moored pontoon having a duct therethrough opening at opposed ends of the pontoon, the duct having a vertical axis rotor therein driving an electrical generator, and at least one deflector vane being located in the duct on each side of the rotor relative to the flow direction, the or each deflector vane extending over a minor part of the width of the duct and being spaced from the sides thereof, each vane being mounted for rotation about a vertical axis so as to be movable between an active position when upstream of the rotor directing water towards the active side of the rotor, and an inactive position when downstream of the rotor.

The deflector vanes may be freely rotatable, the direction of the tidal flow causing each to move between the active and inactive positions, or they may be provided with drive means to enable each to be selectively rotated.

The rotor is preferably cross-flow turbine, more preferably a Banki turbine as described by Mockmore and Merryfield in 1949 ("The Banki Water Turbine", Oregon State College, Bulletin Series No 25, February 1949), but configured with a vertical axis of rotation. This type of turbine has a plurality of shaped vanes arranged around, but spaced from, a central axle, offering the advantage that potentially clogging materials, such as seaweed, will be flushed clear of the rotor by the emerging water, assisted by centrifugal force. Conventionally, this type of turbine is configured with a horizontal axis and a vertical head of water typically of 1-200 m. It has been found that a vertical rotor, in conjunction with reversible deflector vanes, offers advantages of simple construction and operation in a tidal flow.

The rotor is preferably supported in the pontoon by bearings at one end thereof above the water level. The generator is also suitably mounted above the rotor, and therefore above the water, again simplifying construction and maintenance.

It is envisaged that the pontoon will be moored in a river estuary where there is no wave activity. This will again permit simpler construction and will also ensure that providing moorings—for example by concrete blocks on the river bed—is straightforward, and the environmental impact minimal. Depths of in excess of 5 m are likely to be suitable. The proximity to the shore will permit easier connection to the electrical distribution grid, and therefore lower cost.

BRIEF DESCRIPTION OF THE DRAWINGS

In the drawings, which illustrate diagrammatically an exemplary embodiment of the invention:

FIG. 2 is a sectional plan view on line A-A in FIG. 1.

DETAILED DESCRIPTION OF THE ILLUSTRATED EMBODIMENT

Figure 1:
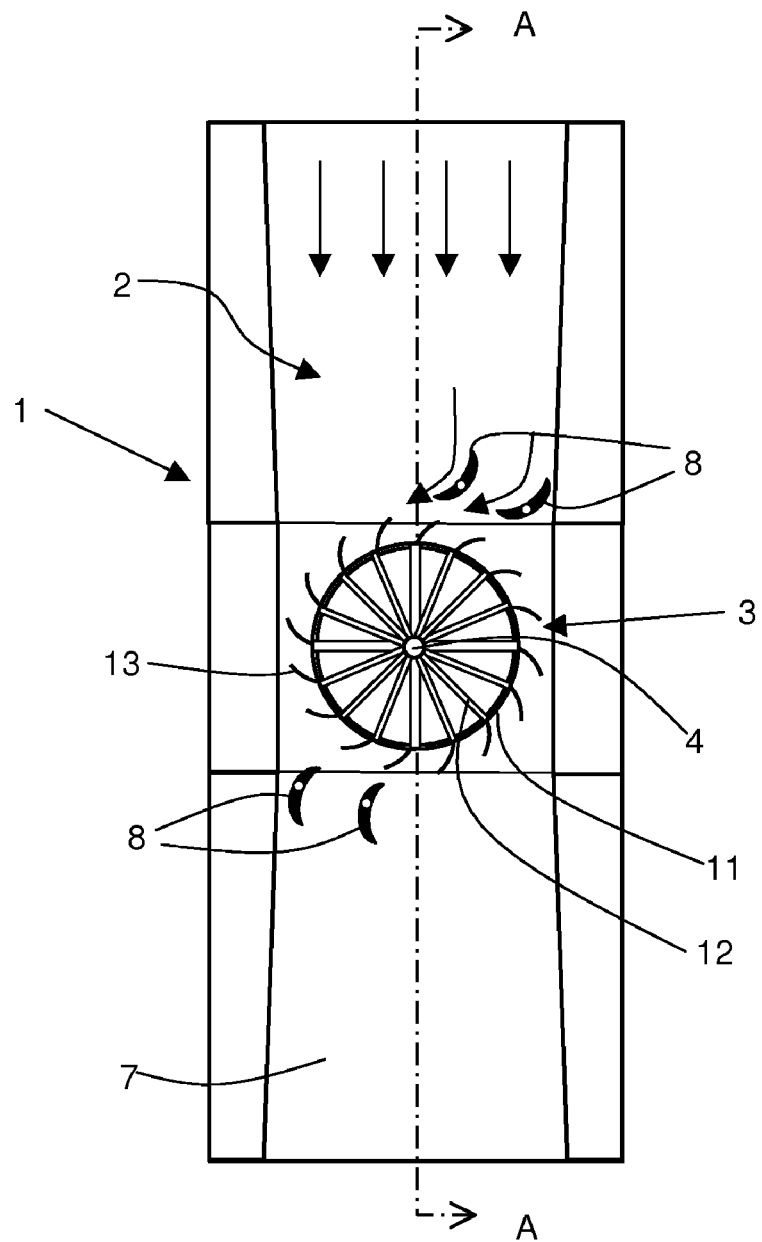
FIG. 1 is a vertical cross-section through the apparatus, on a longitudinal centre-line.

The apparatus consists of a floating pontoon 1 having a hollow duct 2 therethrough opening at each end of the pontoon. A turbine 3 is mounted in the duct 2 on a vertical axle 4 which is supported by a bearing 5 at the upper end thereof and which turns an electrical alternator 6 located above the bearing. In practice, a pair of variable speed, variable torque alternators will be provided, driven from the shaft, to provide redundancy, ensuring continuity of supply. Each alternator will normally run at a mean power of about 100 kW, but very exceptionally at 250 kW, so the maximum installed capacity is 500 kW. The alternators feed through AC/DC/AC converters to provide mains synchronised connection through a submarine cable to the electricity grid. The generators also supply low voltage power for the control system, for onboard battery charging (providing emergency power in the event of generator or other failure), and for navigational and deck lighting.

The duct is preferably configured as a Bernoulli or Venturi flume to accelerate and diffuse the water on to the rotor blades. The duct therefore tapers outwardly from the turbine to the ends of the pontoon, with the duct sides making an angle of approximately 7 degrees with the longitudinal axis of the pontoon. In addition, the floor 7 of the duct slopes outwardly from the turbine section at each side with an inclination of approximately 7 degrees to the horizontal.

The illustrated turbine consists of three steel bands 11 connected to the axle 4 by radial spokes 12, the resulting framework mounting two rows of sixteen blades 13 at 22.5 degree intervals. Each blade is an approximately 70 degree section of circular tube. The inner ends of the blades are radial on the disks and the outer ends make an angle of about 30 degrees with the tangent as recommended by Mockmore and Merryfield in the paper hereinbefore identified. It will be understood that other turbine configurations may be employed.

Four vertical deflector vanes 8 are mounted in the duct, two on each side of the turbine. The deflector vanes 8 extend over substantially the height of the duct, and each is carried by a vertical shaft 9 offset from the centre of the vane so that the vane can pivot between an active position, as shown at the left-hand end of the Figures, and an inactive position, as shown at the right-hand end of the Figures, at least partially under the influence of the tidal flow through the duct.

In the active position, the deflector vanes 8 extend at an angle such that the tidal water impinges on the turbine rotor at an angle of 16° to the tangent of the periphery of the rotor, this being the optimum as reported by Mockmore and Merryfield in the paper hereinbefore referred to. In the inactive position, the deflector vanes are generally aligned with the flow of water leaving the turbine so as to offer substantially no resistance to flow. In practice, the plates will come to rest against a stop 10 to make a small angle with the longitudinal axis, say 10°, so that, when the tide reverses, the incoming water flow will tend to cause the plate to pivot towards its active position. At the same time, the reversed flow will cause the other deflector vane to pivot towards its inactive position. The shafts 9 may thus be freely rotatably mounted, but are also provided with drive means to rotate them.

The vanes are positioned to one side of the centreline through the duct, so as to shield the flow from the inactive side of the turbine, i.e. the side on which the blades are moving against the direction of flow, and to direct water from that side into the turbine at the desired angle of 16 degrees to the tangent to the circumference of the turbine rotor. It will be seen that the further away from the centreline the vane is located, the greater the angle the vane needs to make with the centreline.

The vanes 8 are conveniently formed of steel or glass-fibre reinforced plastics material, and small vertical bars 14 project from each edge of each vane upwardly through the pontoon deck, the pairs of vanes being linked to each other by means of cross-links 15 connecting the bars 14 at the leading edges together and the bars 14 at the trailing edges to each other. A hydraulic cylinder (not shown) can then be linked to one of the cross-links for each pair to cause rotation of the vanes 8.

Electromagnetic flow meters are provided in the duct, both in the free stream and close to the turbine to measure flow speeds, and depth meters are located at the entrances to the duct and in the venturi region. Additionally, meters will monitor the rotation of the turbine, electrical current, voltage and power, and the generator temperature. The data can be communicated ashore via an appropriate cable, or wirelessly if required.

The control system is arranged to control the performance of the apparatus in three ways. Firstly, the ratio of the speed of the blade tips of the turbine to the water flow speed, the Tip Speed Ratio, is optimised through the hydraulic controls for the downstream deflector vanes 8, acting as throttles. Secondly, the ratio of the flow speed at the turbine rotor to the square root of the product of the flow depth in the venturi duct and the gravitational acceleration (9.81 ms$^{-1}$), the Froude Number, is also optimised by controlling the downstream deflector vanes to throttle the flow. Thirdly, the electrical load on the system provides a variable resistive torque on the rotor and is controlled to optimise electrical production. The overall control strategy is to optimise electricity generation by maximising output throughout the tidal cycle, in which flow speeds can vary considerably at different times of the day and will, of course reverse twice a day.

Anchorage of the pontoon will be by way of cables (not shown) extending out fore and aft to, for example, concrete block anchors resting on the river bed.

It is envisaged that a single pontoon in accordance with the invention, having a length of 20 m, a beam of 10 m, a rotor diameter of 4.6 m and a rotor depth of 4 m would generate at a peak rate of 500 kW and could produce 1000 MWhr of electricity in a year. An array of 20 such pontoons would typically be moored at a given location and would thus generate at up to 10 MW. Because the pontoons can readily be constructed using standard ship-building techniques, with the electrical components provided in container form, and therefore readily replaceable, the capital cost of the apparatus would be low relative to other known forms of tidal power generation systems, and thus the cost of power produced would be highly competitive compared with other renewable energy sources.

Suitable locations would be regions of high flow in estuaries outside the navigation channels.

Cables conducting the electricity to the shore for connection to the distribution grid are preferably run along the river bed to a pier or jetty projecting into the river, so as to minimise the distance over which high cost submarine cables need to be run. More conventional, and therefore lower cost, cables can then be provided along the jetty to the shore. This arrangement will be convenient where an array of pontoons is deployed in a particular location.

A design life of twenty years could readily be achieved; with an array of the devices, replacement of any one of the pontoons can be achieved while temporarily losing only a small proportion of the generating capacity.

The invention claimed is:

1. A tidal power apparatus, comprising a moored pontoon having a duct therethrough opening at opposed ends of the pontoon, the duct having a vertical axis rotor therein driving an electrical generator, and a plurality of deflector vanes being located in the duct on each side of the rotor relative to the flow direction, each deflector vane extending over a minor part of the width of the duct and being spaced from the sides thereof, each vane being mounted for rotation about a vertical axis so as to be movable between an active position when upstream of the rotor directing water towards the active, side of the rotor, and an inactive position when downstream of the rotor; and means for measuring tidal flow adjacent to the pontoon, and control means for rotating the vane or vanes in the active position thereof in response to the measured tidal flow, whereby to optimize the Froude Number at the rotor, wherein the control means include a hydraulic cylinder associated with each vane.

2. A tidal power apparatus according to claim 1, wherein the vertical axis is offset from the center of each vane, whereby when the direction of the tidal flow through the duct changes, the change in flow can cause the vanes to rotate between the active and inactive positions.

3. A tidal power apparatus according to claim 1, wherein the control means is also arranged to rotate the vanes when in the active position thereof to throttle the flow through the duct.

4. A tidal power apparatus according to claim 1, wherein each hydraulic cylinder is a water-powered cylinder.

5. A tidal power apparatus according to claim 1 wherein the rotor is a crossflow turbine.

6. A tidal power apparatus according to claim 5, wherein the turbine is a Banki turbine.

7. A tidal power apparatus according to claim 1 comprising two vanes on each side of the rotor.

8. A tidal power apparatus according to claim 1 wherein the duct tapers in plan inwardly from the ends of the pontoon to the rotor.

9. A tidal power apparatus according to claim 1 wherein the lowermost surface of the duct slopes upwardly from the ends of the pontoon to the rotor.

10. A tidal power apparatus according to claim 1 wherein the generator and associated electrical apparatus are mounted in a detachable module on the deck of the pontoon.

11. A tidal power apparatus, comprising a moored pontoon having a duct therethrough opening at opposed ends of the pontoon, the duct having a vertical axis rotor therein driving an electrical generator, and a plurality of deflector vanes being located in the duct on each side of the rotor relative to the flow direction, each deflector vane extending over, a minor part of the width of the duct and being spaced from the sides thereof, each vane being mounted for rotation about a vertical axis so as to be movable between an active position when upstream of the rotor directing water towards the active, side of the rotor, and an inactive position when downstream of the rotor; and means for measuring tidal flow adjacent to the pontoon, and control means for rotating the vane or vanes in the active position thereof in response to the measured tidal flow, whereby to optimize the Froude Number at the rotor, wherein the control means include a hydraulic cylinder associated with each vane wherein the width of each vane is a sixth to a quarter of the width of the duct at the location of the vane or vanes.

12. A tidal power apparatus, comprising a moored pontoon having a duct therethrouph opening at opposed ends of the pontoon, the duct having a vertical axis rotor therein driving an electrical generator, and a plurality of deflector vanes being located in the duct on each side of the rotor relative to the flow direction, each deflector vane extending over, a minor art of the width of the duct and being spaced from the sides thereof, each vane being mounted for rotation about a vertical axis so as to be movable between an active position when upstream of the rotor directing water towards the active side of the rotor and an inactive position when downstream of the rotor; wherein the duct tapers in plan inwardly from the ends of the pontoon to the rotor and the sides of the duct make an angle of about 7 degrees to the longitudinal axis of the pontoon.

13. A tidal power apparatus, comprising a moored pontoon having a duct there therethrough opening at opposed ends of the pontoon, the duct having a vertical axis rotor therein driving an electrical generator, and a plurality of deflector vanes being located in the duct on each side of the rotor relative to the flow direction, each deflector vane extending over, a minor part of the width of the duct and being spaced from the sides thereof, each vane being mounted for rotation about a vertical axis so as to be movable between an active position when upstream of the rotor directing water towards the active side of the rotor, and an inactive position when downstream of the rotor, wherein the lowermost surface of the duct slopes upwardly from the ends of the pontoon to the rotor and the lowermost surface of the duct makes an angle of about 7 degrees to the horizontal.

* * * * *